G. S. WILSON & J. RHODE.
GRASSHOPPER-CATCHER.
No. 192,553.  Patented June 26, 1877.
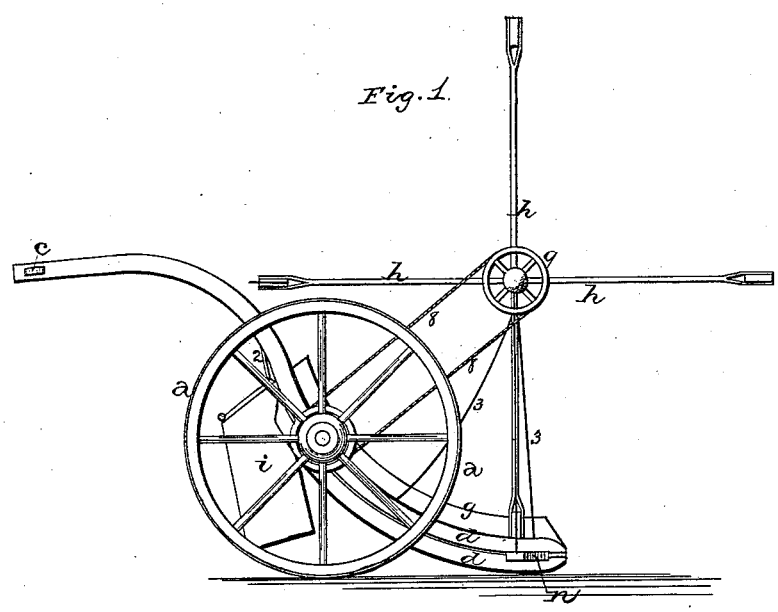
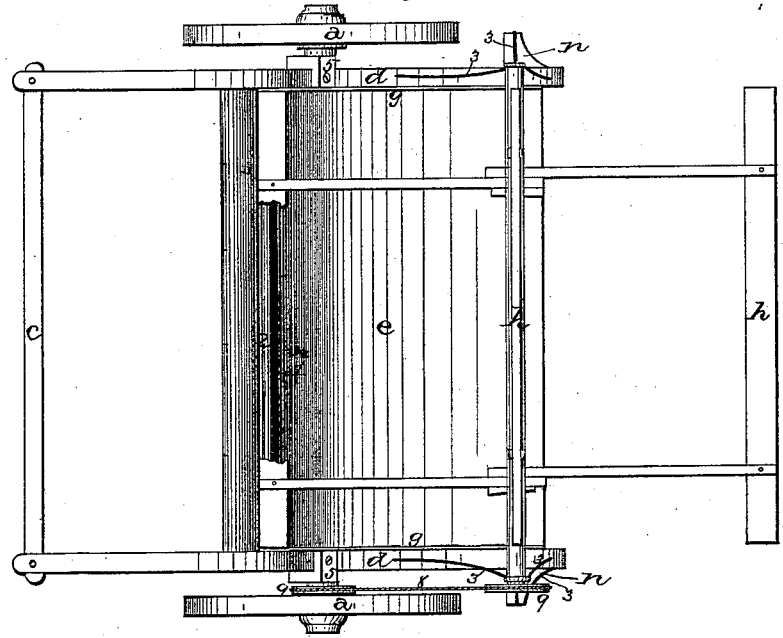
WITNESSES:
J. Wm Garner
Albert de Zeyk
INVENTORS
Geo. S. Wilson
Jno. Rhode
per
F. A. Lehmann, Atty

UNITED STATES PATENT OFFICE.

GEORGE S. WILSON, OF MALVERN, AND JOHN RHODE, OF TABOR, IOWA.

IMPROVEMENT IN GRASSHOPPER-CATCHERS.

Specification forming part of Letters Patent No. 192,553, dated June 26, 1877; application filed February 23, 1877.

*To all whom it may concern:*

Be it known that we, GEO. S. WILSON, of Malvern, and JNO. RHODE, of Tabor, in the county of Mills and State of Iowa, have invented certain new and useful Improvements in Grasshopper-Catchers; and we do hereby declare the following to be a full, clear, and exact description of the invention, such as will enable others skilled in the art to which it pertains to make and use it, reference being had to the accompanying drawings, which form part of this specification.

Our invention relates to an improvement in grasshopper-catchers; and it consists in the arrangement and combination of parts that will be more fully described hereinafter, whereby the insects are swept back into a receptacle at the rear end of the frame, and preserved whole.

The accompanying drawings represent our invention.

*a a* represent two driving-wheels, upon which the machine is propelled about by a person or persons pushing from behind on the handle *c*. The frame consists, preferably, at each end, of the two curved timbers *d*, as shown, between which is clamped a curved sheet-metal plate, *e*, which forms the floor of the machine. Secured to the inside edge of the top timber, at each end, is a curved plate, *g*, which forms a flange along each end of the machine, in order to prevent the insects from being swept or jumping from the floor.

To the rear edge of the floor is secured a box or receptacle, *i*, as long as the floor is wide, into which the insects are swept whole by the reel *h*. The cover of this box does not quite reach to the forward edge, thus leaving the space 1, through which the insects fall into the box. The upper edge of the lid is turned backward a considerable distance, so as to form the flange 2, thereby preventing the insects from being swept back past the floor and opening 1 upon the ground behind.

Extending across the front edge of the machine is a board or bar, *n*, sharp at its front edge, and the ends of which project beyond each side of the frame, and serve as a support for one of the three braces or standards 3, upon the tops of which the reel is journaled, and operated by the belt or chain 8 over the pulleys 9. The axles 5, upon which the wheels *a* are placed, have their inner ends made U-shaped, so as to straddle over the edges of the timbers *d*, to which they are secured by set-screws. By thus forming these spindles a heavy axle is dispensed with, and the wheels can be adjusted back and forth, so as to regulate the distance the edge of the floor shall travel from the ground.

The sweeps of the reel may consist either of plain strips of wood, or the strips may have sheets of rubber or any other suitable material clamped in between, or secured to them, as shown.

We are aware that reels have been used to sweep the insects toward revolving rollers, for the purpose of crushing them, and this we disclaim.

Having thus described our invention, we claim—

1. In a grasshopper-catcher, the combination of a frame that is placed upon wheels, and designed to be pushed from behind, and that is provided with the curved floor *e*, box *i*, lid provided with a flange, 2, and a reel, *h*, substantially as shown.

2. The frame composed of the two curved timbers *d* between which the floor is clamped, curved flanges *g*, handle *c*, bar *n*, standards 3, and reel *h*, substantially as described.

In testimony that we claim the foregoing we have hereunto set our hands this 29th day of January, 1877.

GEORGE S. WILSON.
JOHN RHODE.

Witnesses:
S. P. McCORMICK,
H. R. McCORMICK.